United States Patent [19]
Hayakawa et al.

[11] Patent Number: 5,905,237
[45] Date of Patent: May 18, 1999

[54] VEHICULAR KNOB SWITCH APPARATUS

[75] Inventors: Hiroshi Hayakawa; Atsuo Takahashi, both of Miyagi-ken, Japan

[73] Assignee: Alps Electric Co., Ltd., Tokyo, Japan

[21] Appl. No.: 09/045,359

[22] Filed: Mar. 20, 1998

[30] Foreign Application Priority Data

Mar. 21, 1997 [JP] Japan .................................. 9-068274

[51] Int. Cl.⁶ .................................................. H01H 3/16
[52] U.S. Cl. .................................. 200/61.28; 200/61.39; 200/336; 200/501; 200/564
[58] Field of Search ........................... 200/61.27, 61.28, 200/61.39, 61.54, 501, 336.567, 564, 332.2

[56] References Cited

U.S. PATENT DOCUMENTS

| | | | |
|---|---|---|---|
| 4,685,759 | 8/1987 | Kurtz ................................... | 200/51.14 |
| 4,795,867 | 1/1989 | Ohi et al. .............................. | 200/37 R |
| 5,581,058 | 12/1996 | Javery et al. ............................ | 200/4 |
| 5,610,378 | 3/1997 | DuRocher et al. .................. | 200/61.54 |

*Primary Examiner*—Michael L. Gellner
*Assistant Examiner*—Nhung Nguyen
*Attorney, Agent, or Firm*—Brinks Hofer Gilson & Lione

[57] ABSTRACT

A vehicular knob switch apparatus suitable for the attainment of size reduction and multi-function is provided. An operating knob is attached to a cylindrical housing rotatably from the exterior. Integral with the operating knob is a first gear which is disposed in the circumferential direction of the operating knob. A second gear is brought into mesh with the first gear in such a manner that the respective axes are orthogonal to each other. A support shaft of the second gear is held by a holder which is fixed to the interior of the housing. Also held by the holder is a printed circuit board which is disposed in the axial direction of the operating knob. Rotation of the operating knob is transmitted to a rotary volume through both gears and. The rotary volume is mounted on the printed circuit board, and first and second push switches, which are operated by key tops, respectively, are also mounted on the printed circuit board. The key tops are attached to the housing to allow to be operated from the exterior.

3 Claims, 2 Drawing Sheets

VEHICULAR KNOB SWITCH APPARATUS

BACKGROUND OF THE INVENTION

The present invention relates to a vehicular knob switch apparatus called stalk switch and more particularly to a vehicular knob switch apparatus having a cylindrical housing and a plurality of operating means, including a rotary operating knob, disposed in the housing.

Generally, in the vicinity of a vehicular steering column there is provided a vehicular knob switch apparatus called stalk switch for controlling the motion of windshield wipers, headlights, etc. The vehicular knob switch apparatus comprises a cylindrical housing supported pivotably on the steering column side, an operating knob attached to the housing rotatably from the exterior, and a rotary detector such as a rotary volume which is operated by a rotational operation of the operating knob. By operating the housing pivotally or by rotating the operating knob there are performed on-off switching of a wiper device, change-over in strength and in intermittent motions of the wiper device, on-off switching of headlights, etc.

According to an example of a known vehicular knob switch apparatus, a printed circuit board is enclosed in a housing so as to be orthogonal to the axis of an operating knob, and a rotary shaft of a rotary detector mounted on the printed circuit board is rotated by the operating knob. In the vehicular knob switch apparatus thus constructed, when the operating knob is rotated in either forward direction or reverse direction, the rotary shaft rotates in interlock with the operating knob, so that a relative position between a brush of the rotary detector and a pattern changes, whereby an electric signal corresponding to the rotating motion of the operating knob is outputted to the exterior.

In vehicular knob switch apparatuses, key tops and the like are disposed at arbitrary positions of the housing separately from the operating knob to operate not only the rotary detector but also other electric components, thereby attaining multi-function. In the above conventional vehicular knob switch apparatus, however, a printed circuit board with the rotary detector mounted thereon is enclosed in the housing in an orthogonal relation to the axis of the operating knob. Therefore, it is difficult to mount other electric components on the printed circuit board and it is required to disposed another printed circuit board within the housing, thus giving rise to the problem that the number of components used and the size of the entire apparatus become larger.

SUMMARY OF THE INVENTION

In the vehicular knob switch apparatus of the present invention, a first gear integral with a rotary operating knob and a second gear for operating a rotary shaft of a rotary detector are brought into mesh with each other so that the respective axes are orthogonal to each other, and a rotational operating force of the operating knob is transmitted to the rotary detector through the first and second gears. According to this construction, a printed circuit board with the rotary detector mounted thereon can be disposed in the axial direction of the operating knob and hence electric components other than the rotary detector can also be mounted on the printed circuit board. Thus, the vehicular knob switch apparatus of the present invention is suitable for the attainment of size reduction and of multi-function.

The vehicular knob switch apparatus of the present invention comprises a cylindrical housing, an operating knob attached to the housing rotatably from the exterior, a first gear integral with the operating knob and having a large number of teeth in the rotating direction of the operating knob, a second gear meshing with the teeth of the first gear and having a support shaft orthogonal to the axis of the operating knob, a rotary detector adapted to operate with rotation of the second gear, and a printed circuit board with a plurality of electric components, including the rotary detector, mounted thereon. The printed circuit board is disposed within the housing in the axial direction of the operating knob.

The first gear and the operating knob may be formed integrally. Alternatively, both may be formed separately and then rendered integral with each other in a subsequent step, whereby it is possible to simplify the mold structures for the operating knob and the first gear.

Moreover, if a holder which holds the operating knob rotatably is fixed to the interior of the housing and both second gear and printed circuit board are held by the holder, then the operating knob, second gear and printed circuit board can be unitized beforehand to the holder and this unit can be mounted into the housing, whereby the assembling work efficiency is improved.

Further, when a key top separate from the operating knob is disposed in the housing, a push switch operated by the key top may be mounted on the surface mounting the second gear on the printed circuit board, but if it is mounted on the side opposite to the second gear, it becomes possible to effectively utilize both-side spaces of the printed circuit board. Also in this point it is possible to attain the reduction in size of the housing.

DETAILED DESCRIPTION OF A PREFERRED EMBODIMENT

Figure 1:
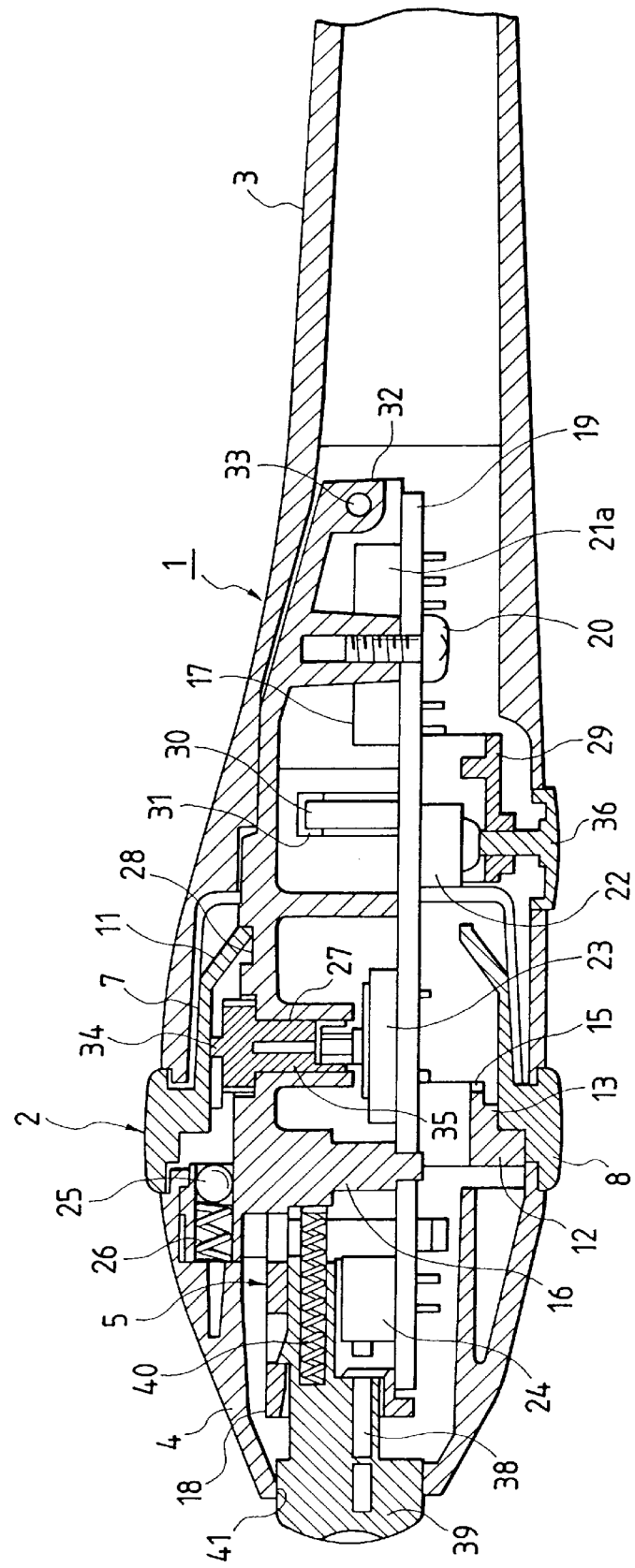
FIG. 1 is a sectional view showing a principal portion of a vehicular knob switch apparatus according to an embodiment of the present invention.
Figure 2:
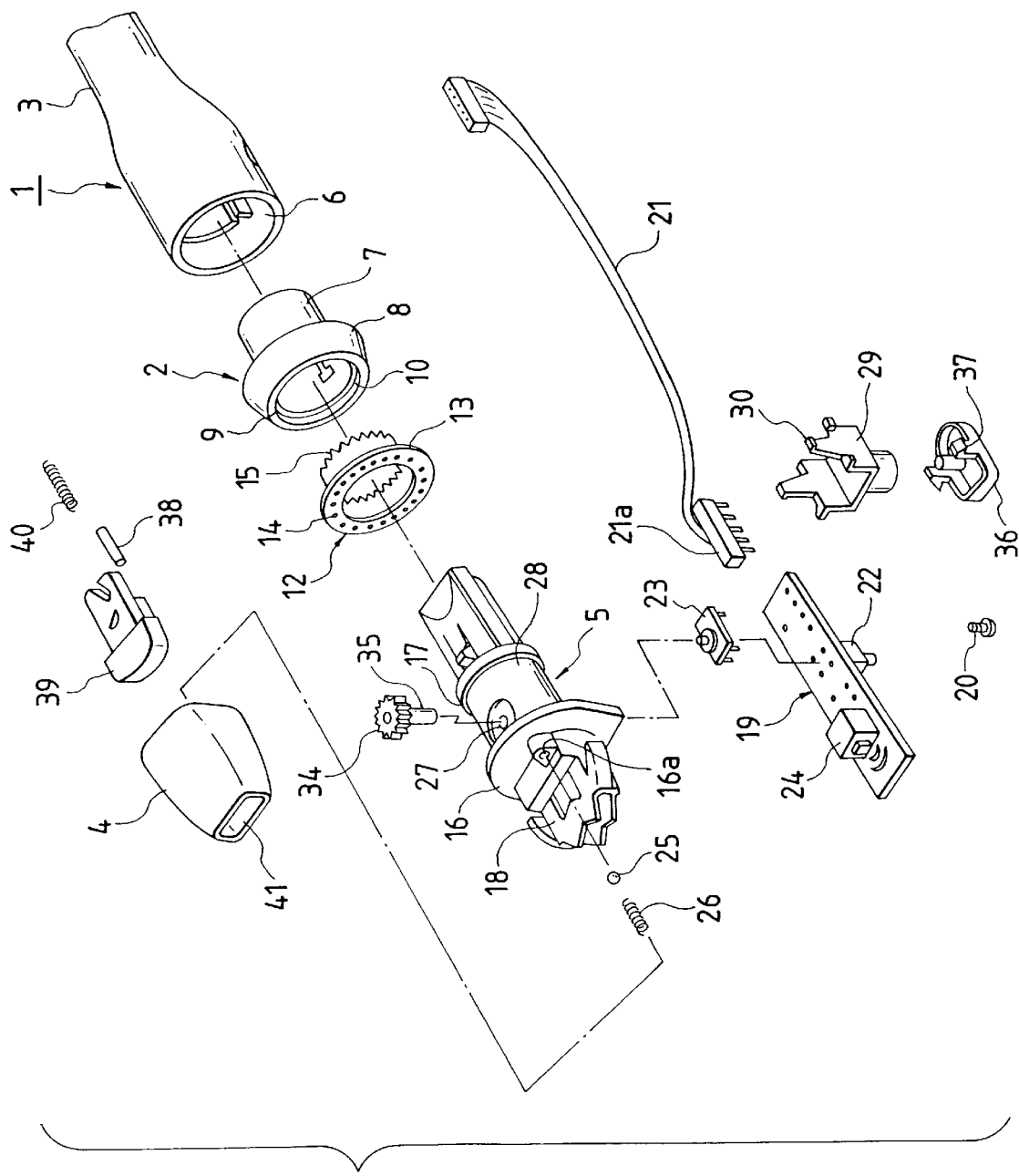
FIG. 2 is an exploded perspective view thereof.

A vehicular knob switch apparatus embodying the present invention will be described hereinunder with reference to the accompanying drawings, in which FIG. 1 is a sectional view showing a principal portion of the vehicular knob switch apparatus and FIG. 2 is an exploded perspective view thereof.

As shown in those figures, the vehicular knob switch apparatus has a cylindrical housing 1 which constitutes a part of a combination switch and a cylindrical operating knob 2 attached rotatably to the housing 1. The housing 1 comprises a stalk portion 3 on the base end side and a case portion 4 on the tip end side, with the operating knob 2 being disposed between the stalk portion 3 and the case portion 4. A holder 5 is enclosed in the housing 1. The holder 5 is fixed to the base end side stalk portion 3, and the tip end side case portion 4 is attached to the holder.

The tip end side of the stalk portion 3, which is formed by molding using a synthetic resin, is designed to be thicker than the base end side thereof, and the operating knob 2 is inserted rotatably into an opening 6 formed in the tip end of the stalk portion 3. The operating knob 2, which is also formed by molding using a synthetic resin, comprises a cylindrical portion 7 fitted in the opening 6 and a grip ring portion 8 formed integrally on the tip end side of the cylindrical portion 7 and having an outer diameter slightly larger than the opening 6. A stepped portion 9 is formed on the inner peripheral surface of a tip end side opening of the grip ring portion 8, and an engaging recess 10 is formed in the stepped portion 9. On the other hand, a plurality of elastic engaging pawls 11 for engagement with a ring groove 28 to be described later of the holder 5 are integrally formed inside the cylindrical portion 7.

Integral with the operating knob 2 is a cylindrical member 12 made of a synthetic resin. The cylindrical member 12 has a flange portion 13 to be engaged with the stepped portion 9 of the grip ring portion 8. An engaging lug (not shown) of formed on the flange portion 13 comes into engagement with the engaging recess 10, thereby permitting integral rotation of both operating knob 2 and cylindrical member 12. A large number of click grooves 14 are formed in an end face on the tip end side of the flange portion 13 so as to be arranged in the circumferential direction of the operating knob 2. Further, a first gear 15 is formed at an end face on the base end side of the cylindrical member 12 in such a manner that its teeth are arranged also circumferentially of the operating knob 2.

The holder 5 formed integrally using a synthetic resin has a generally disc-like flange portion 16 whose outer peripheral side has been cut out partially, a first holding portion 17 projecting axially from an end face on the base end side of the flange portion 16, and a second holding portion 18 projecting axially from an end face on the tip end side of the flange portion 16. The flange portion 16 is fitted with the stepped portion 9 of the operating knob 2. A printed circuit board 19 is attached with a bolt 20 to the holder 5 in the axial direction of the operating knob 2, and to the base end side of the printed circuit board 19 is connected a wire harness 21 through a connector 21a. On the lower surface of the printed circuit board 19 is mounted a first push switch 22, with its stem facing downward, while on the upper surface of the printed circuit board 19 are mounted a rotary volume 23 as a rotary detector and a second push switch 24. The rotary volume 23 is disposed so that its rotating shaft faces upward, and the second push switch 24 is disposed so that its stem faces the tip end side. The length of the printed circuit board 19 is designed correspondingly to the length required for mounting the connector 21a up to the second push switch 24. Further, the axial length of the holder 5 is designed almost equal to the length of the printed circuit board 19.

In the flange portion 16 is formed a through hole 16a in the axial direction of the operating knob 2, and a ball 25 for engagement with and disengagement from the click grooves 14 of the operating knob 2 and a coiled spring 26 for urging the ball 25 to the base end side are inserted into the through hole 16a. In the first holding portion 17 is formed a through hole 27 extending in a direction orthogonal to the board surface of the printed circuit board 19, and a ring groove 28 is formed on the base end side relative to the through hole 27 and in the circumferential direction of the operating knob 2. By snap-engagement of the elastic engaging pawls 11 with the ring groove 28 the operating knob 2 is held in an endless rotatable manner with respect to the holder 5. Further, in the first holding portion 17 are formed a locking hole 31 for locking therein of an elastic engaging pawl 30 of a guide member 29 and a through hole 32 formed in a direction orthogonal to the axial direction of the housing 1. By inserting a fixing pin 33 into the through hole 32 from the exterior of the stalk portion 3 the holder 5 is fixed to the interior of the housing 1.

Into the through hole 27 is inserted a support shaft 35 of a second gear 34, the support shaft 35 being splined to the rotating shaft of the rotary volume 23. Teeth of the second gear 34 and of the first gear 15 are in mesh with each other, and the axes of both gears 15 and 34 are orthogonal to each other. Under the first push switch 22 is disposed a key top 36 which is exposed from the stalk portion 3. By pushing the key top 36 along the guide member 29 the first push switch 22 is operated. The key top 36 has a pair of inwardly projecting engaging pawls 37, which pawls, while the key top is not in operation, come into engagement with the inner surface of the stalk portion 3 to prevent dislodgment of the key top.

On the other hand, another key top 39 for actuating the second push switch 24 through a push rod 38 is held movably by the second holding portion 18. The key top 39 is urged toward its initial position by means of a return spring 40. The case portion 4 is also held by the second holding portion 18, and the key top 39 projects from an opening 41 formed in the tip end of the case portion 4.

In the vehicular knob switch apparatus constructed as above, when the operating knob 2 attached rotatably to the cylindrical housing 1 is rotated from the exterior, the cylindrical member 12 integral with the operating knob 2 is interlocked with the rotation, so that the ball 25 is engaged with and disengaged from the click grooves 14 formed in the cylindrical member 12, whereby there is obtained a click feeling. At the same time, the first gear 15 on the cylindrical member 12 comes into mesh with the second gear 34 and rotates the second gear, with the result that the rotation of the knob 2 is transmitted to the rotating shaft of the rotary volume 23 through the first and second gears 15, 34. The rotary volume in turn outputs an electric signal responsive to the rotation of the knob 2, which signal is outputted from the printed circuit board 19 through the wire harness 21.

If the key top 36 exposed from the stalk portion 3 of the housing 1 is pushed upward in FIG. 1, the key top 36 is guided by the guide member 29 and actuates the first push switch 22. An on-off signal provided from the first push switch 22 is outputted from the printed circuit board 19 through the wire harness 21. In this ON state, if the operator releases the pushing force against the key top 36, the first push switch 22 turns OFF and the key top is forced back to its initial position by the biasing force of the first push switch itself. This is the same in the case where the other key top 39 projecting from the tip end of the case portion 4 is pushed to the right in FIG. 1.

Although the operating knob 2 used in the above embodiment can be rotated in an endless manner, no limitation is placed thereon. There may be provided a stopper which limits the rotation of the operating knob 2 to a predetermined rotational angle within 360°, thereby allowing the operating knob to perform a finite rotation.

According to the present invention described above as an embodiment thereof, the following effects are attained.

The vehicular knob switch apparatus of the present invention is provided with a cylindrical housing, an operating knob attached to the housing rotatably from the exterior, a first gear having a large number of teeth formed in the rotating direction of the operating knob, a second gear meshing with the teeth of the first gear and having a support shaft orthogonal to the axis of the operating knob, a rotary detector adapted to operate with rotation of the second gear, and a printed circuit board with a plurality of electric components, including the rotary detector, mounted thereon. Further, the printed circuit board is disposed within the housing in the axial direction of the operating knob, electric components other than the rotary detector can be mounted on the printed circuit board with the rotary detector mounted thereon. Therefore, the vehicular knob switch apparatus of the present invention is suitable for the attainment of size reduction and multi-function.

Moreover, if a holder which holds the operating knob rotatably is fixed to the interior of the housing and the second gear and printed circuit board are held by the holder, it is possible to unitize the operating knob, second gear and printed circuit board beforehand to the holder and then mount this unit into the housing, whereby the assembling work efficiency is improved.

Further, if another key top separate from the operating knob is attached to the housing and if a push switch operated by the key top is mounted on the printed circuit board at the side opposite to the second gear, it is possible to effectively utilize both-side spaces of the printed circuit board and thereby attain a further reduction of size.

What is claimed is:

1. A vehicular knob switch apparatus comprising:

a cylindrical housing;

an operating knob attached to said housing rotatably from the exterior;

a first gear integral with said operating knob and having a multitude of teeth formed in the rotating direction of the operating knob;

a second gear meshing with the teeth of said first gear and having a support shaft orthogonal to the axis of said operating knob;

a rotary detector adapted to rotate with rotation of said second gear; and a printed circuit board with a plurality of electric components, including said rotary detector, mounted thereon;

said printed circuit board being disposed within said housing in the axial direction of said operating knob.

2. A vehicular knob switch apparatus according to claim 1, wherein a holder for holding said operating knob rotatably is fixed to the interior of said housing, and said second gear and said printed circuit board are mounted to said holder.

3. A vehicular knob switch apparatus according to claim 1 or claim 2, further comprising a key top which is operated from the exterior of said housing, and a push switch which is operated through said key top.

* * * * *